July 4, 1972  F. L. JONSSON ET AL  3,674,403

HIGH-PRESSURE APPARATUS

Filed Dec. 4, 1970  2 Sheets-Sheet 1

INVENTOR
FINN LENNART JONSSON
ET. AL
BY
*Steward H Steward*
their ATTORNEYS.

INVENTOR
FINN LENNART JONSSON
ET AL
BY
*Stewart & Stewart*
their ATTORNEYS

United States Patent Office 3,674,403
Patented July 4, 1972

3,674,403
HIGH-PRESSURE APPARATUS
Finn Lennart Jonsson, Sten Trolle, and Baltzar Carl von Platen, Ystad, Sweden, assignors to Etablissement Radiator, Vaduz, Liechtenstein
Filed Dec. 4, 1970, Ser. No. 95,213
Claims priority, application Sweden, Dec. 12, 1969, 17,172
Int. Cl. B29c 1/00; B30b 11/32
U.S. Cl. 425—330                                                5 Claims

ABSTRACT OF THE DISCLOSURE

A high-pressure apparatus, consisting of a high-pressure chamber and a container which contains the high-pressure chamber, the high-pressure chamber being bounded by two pressure generating means acting against each other, as well as of a body composed of separate parts and having a substantially convex outside surface, and a central cavity, the said body surrounding the high-pressure chamber, characterised in that the composite body is surrounded by at least two hollow bodies which are inwardly bounded by a surface that conforms to the outside surface of the composite body, and that the hollow bodies are adapted to be filled with a fluid which can be brought under pressure.

---

Figure 1:
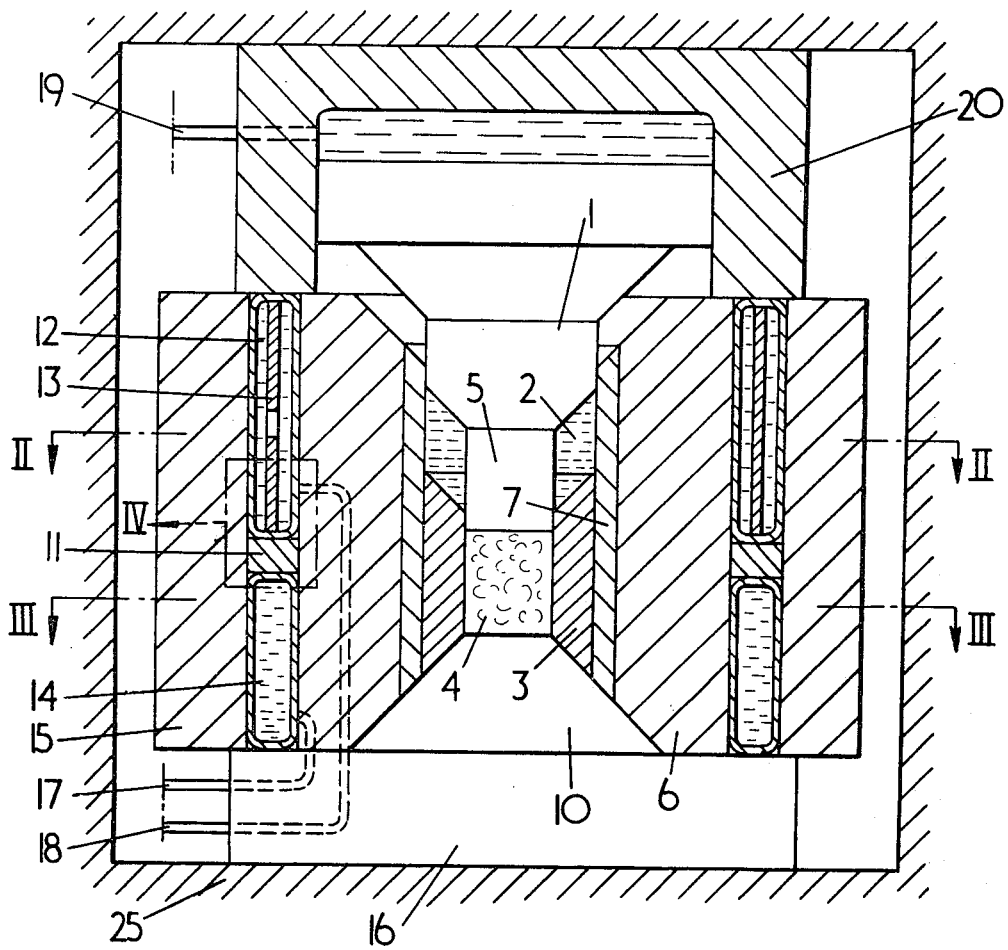

The present invention relates to a high-pressure apparatus comprising a high-pressure chamber and a container which surrounds the high-pressure chamber, the container being defined by a composite body and oppositely acting pressure generating means or pistons, at least one which can be moved inwards towards the centre of the high-pressure chamber.

High-pressure apparatus of this type has been known before. Thus, for instance, U.S. Pat. 3,118,177 describes such high-pressure apparatus, and it is also described there how it is possible to absorb and compensate radially directed forces, by a single substantially cylindrical annular body with hydraulic pressure, as well as to compensate within certain limits radial movements of parts of the high-pressure apparatus.

Further, U.S. Pat. 2,482,342 describes how, by a combination of hydraulic and mechanical devices, outwardly directed forces can be absorbed regardless of the piston forces and radial movements compensated.

High-pressure apparatus known at present, where the high-pressure chamber is surrounded by a composite body, affords, however, very great drawbacks stemming from the fact that component forces directed away from the high-pressure chamber, and possibly a support pressure chamber, cannot be absorbed and compensated by a single enclosing annular body filled with liquid.

Thus, when a pressure generating means, such as a piston, moves into the high-pressure chamber and the support pressure chamber, the resultant radial force which stems from these chambers is displaced in the same direction in which the piston moves.

The resultant force which stems from the enclosing annular body, however, remains stationary in relation to the high-pressure chamber. Even if the two resultant forces have been aligned to begin with, they may be acting in opposite senses, and the aforesaid displacement of the one resultant will cause a twisting and tipping couple to be applied to the parts of which the composite body is constructed. Since the high-pressure apparatuses as such as built to withstand pressures of some tens of kilobars, this torque will be of a very considerable size. In order to avoid shearing movements with the risk of total destruction they involve, it has been necessary to provide these apparatuses with control or stabilizing devices of a complicated kind.

These disadvantages may be eliminated by the present invention in a surprisingly simple way.

According to the present invention there is provided a high-pressure apparatus, consisting of a high-pressure chamber and a container which contains the high-pressure chamber, the high-pressure chamber being bounded by two pressure generating means acting against each other, as well as of a body composed of separate parts and having a substantially convex outside surface, and a central cavity, the said body surrounding the high-pressure chamber, characterised in that the composite body is surrounded by at least two hollow bodies which are inwardly bounded by a surface that conforms to the outside surface of the composite body, and that the hollow bodies are adapted to be filled with a fluid which can be brought under pressure.

Such a high-pressure apparatus is extremely reliable in operation, as well as presenting special advantages, such as susceptibility to automation, which will emerge more clearly from the description.

Figure 2:
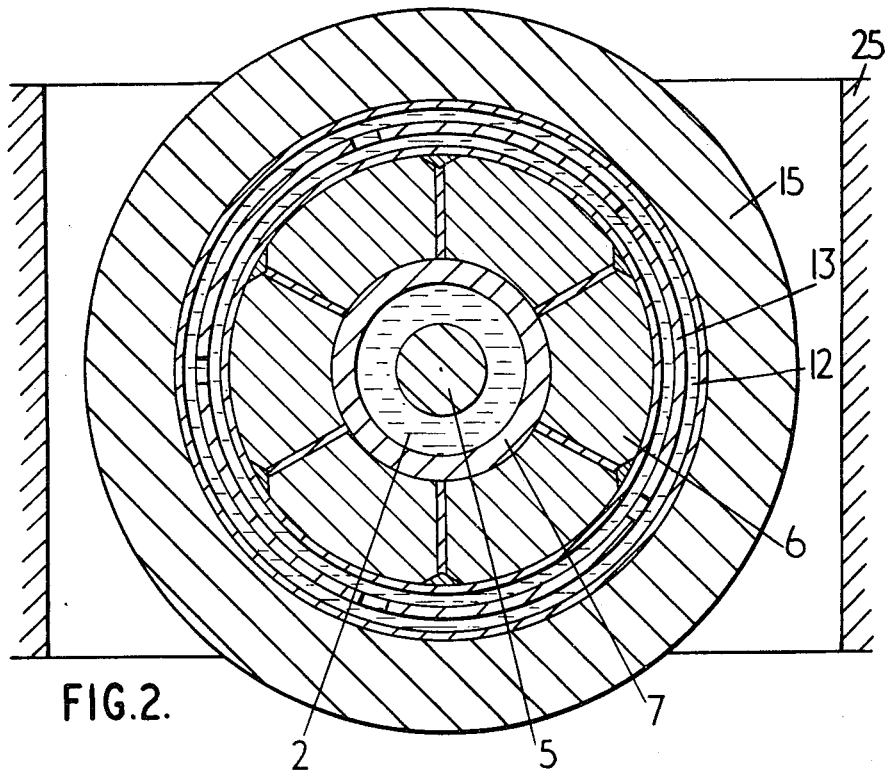
Figure 3:
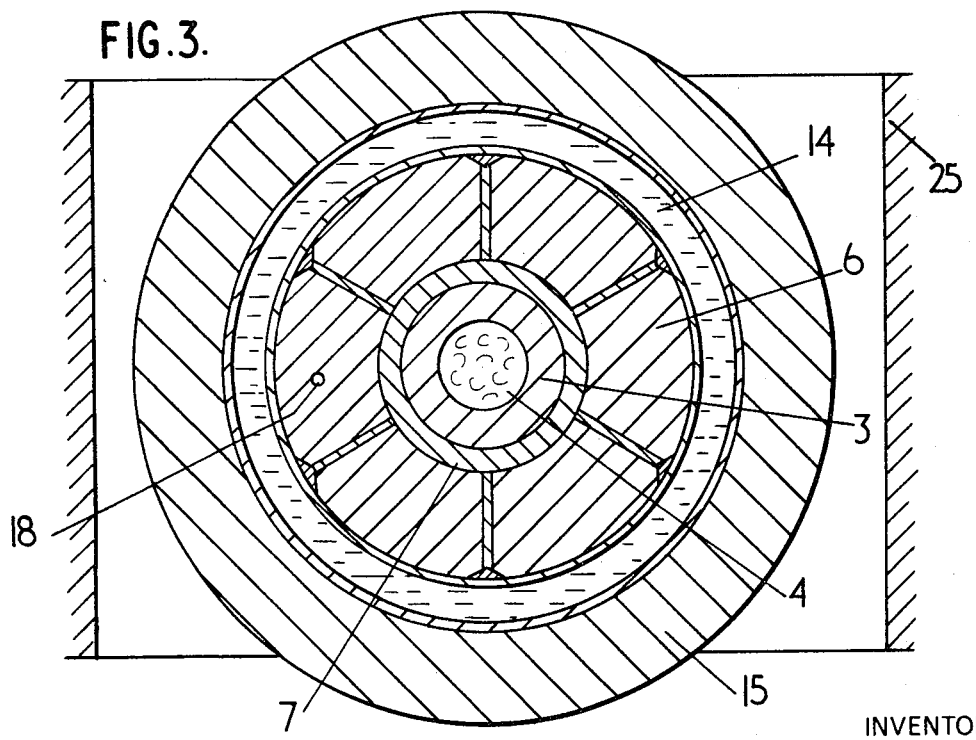

One form of high-pressure apparatus according to the invention is particularly described with reference to the accompanying drawings, wherein:

FIG. 1 is an axial section of a high-pressure apparatus that is compensated against radial forces and movements,
FIG. 2 is a section along the line II—II in FIG. 1,
FIG. 3 is a section along the line III—III in FIG. 1, and
FG. 4 shows (on an enlarged scale) a detail of FIG. 1.

A high-pressure apparatus comprises a high-pressure chamber 4, which is bounded by two oppositely acting pressure generating means, one whereof is a movable piston 1 with an innermost cylindrical part 5, and the other a fixed piston 10. The piston 1 is formed, in a way known per se, of successive cylindrically and conically shaped parts.

The high-pressure chamber is further, bounded by a first inner cylinder 3 and an outwardly disposed composite body, composed of separate pieces or sectors 6, with part cylindrical surfaces and defining a central cavity which contains the high-pressure chamber 4, the cylinder 3, another inner cylinder 7, and a support pressure chamber 2, filled with pressure supporting material, i.e. materials which at high pressure perform as liquids or substantially as liquids.

The composite body formed by the pieces 6 is surrounded by two hollow bodies, namely an upper hollow body 12 and a lower hollow body 14, which are separated by a ring 11. Each hollow body 12 or 14 is inwardly bounded by a cylindrical surface, which thus conforms to the side surface of the composite body. The hollow bodies are further outwardly bounded by a cylindrical surface which is concentric with the inward bounding surface, and by annular surfaces between the cylindrical surfaces. An outer cylinder 15 is provided outside the hollow bodies 12 and 14.

Figure 4:
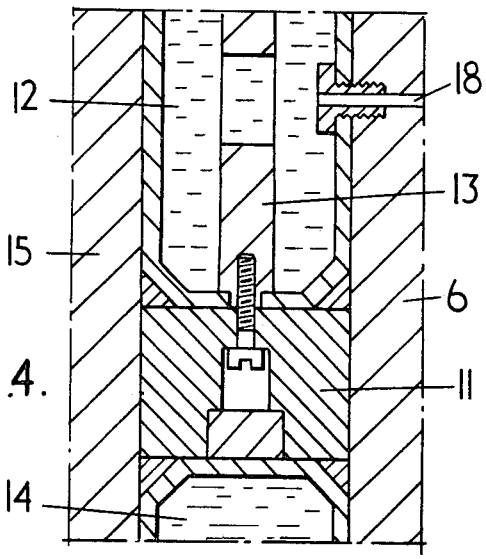

FIG. 4 shows in more detail how the upper hollow body 12 is fitted to the ring 11 by means of a screw-threaded connection, the screw joint engaging a support means 13 provided within the hollow body 12.

The cavity in the hollow body 12 is further connected with a liquid duct 18, which in its turn is connected with regulating means (not shown), such as valves and pressure meters.

The high-pressure apparatus described is mounted in the known way together with an hydraulic press 20 and a liquid duct 19 in a frame 25. A support plate 16 is provided between the lower piston 10 and the frame 21, and the liquid ducts 17, 18 extend through the plate 16.

Adjacent to the pieces or sectors 6 there are provided control means (not shown) for indicating changes of position among the pieces of the composite body, and these control means are adapted to actuate the regulating means mentioned above.

The compound apparatus described here operates in the following manner. When pressure liquid is supplied through the liquid duct 19 to the hydraulic press 20 the piston 1 with its innermost part 5 moves down, the pressure rising both in the high-pressure chamber 4 and the support pressure chamber 2. At the same time the height of these two chambers is reduced, which results in the radial resultant force acting from these chambers being displaced downwards.

Other conditions being unchanged, this should result in a twisting, shearing torque acting upon the sectors 6. Even minimal changes of position among the sectors 6 are, however, registered by the aforesaid control means, and every registered minute change of position so actuates the regulating means that the pressure is increased in the lower hollow body 14 in relation to the pressure in the upper hollow body 12. It will be appreciated that in this way the resultant forces directed inwards from the two hollow bodies will be displaced downwards. Thus the sectors 6 will never be exposed to a shearing torque, as the resultant forces acting in opposite senses will be brought into line with each other through the action of the regulating means.

Regulating means are further provided to prevent the pressure in the hollow body 14 from dropping below the pressure in the hollow body 12. Any risk of the hollow body 14 forcing out the hollow body 12 is eliminated by the illustrated arrangement comprising the support means 13 and the spacing ring 11.

The high-pressure apparatus described above may be varied within the scope of the invention, for instance in respect of the shape of the high-pressure chamber. Thus the high-pressure chamber may be given a polygonal, instead of cylindrical, shape, whilst a corresponding form is given at least to the innermost part of the movable piston, as well as to the cylinders 3 and 7.

A shape other than cylindrical may also be given to the outside surface of the composite body, formed by the pieces or sectors 6, for example by arching out the sectors 6 from the surfaces facing the high-pressure chamber. The essential point is that the inward bounding surfaces of the hollow bodies 12, 14 conform to the side surface of the composite body and that the hollow bodies can be filled with a fluid whose pressure can be varied in such a way that a displacement of the radial resultant force acting from the high-pressure chamber can be compensated by pressure changes, preferably automatically effected, in the hollow bodies with the entailed alterations in the resultant force acting inwards from these hollow bodies.

Various modifications may be within the scope of the invention.

We claim:

1. In a high-pressure apparatus comprising a composite body formed of separate pieces and having a convex outside surface, two pressure generating means forming a high pressure chamber within the composite body at least one of the pressure generating means being movable: the improvement that at least two hollow bodies are arranged at axially spaced locations around the composite body, the said hollow bodies having inner bounding surfaces conforming to the outer surface of the composite body, and means by which the hollow bodies can be filled with a liquid to be brought under pressure.

2. A high-pressure apparatus as claimed in claim 1, in which the inner bounding surface of the hollow bodies and the outside surface of the composite body are cylindrical.

3. A high-pressure apparatus as claimed in claim 2, in which each hollow body is outwardly bounded by a cylindrical surface, coaxial with the inner cylindrical surface, and by annular surfaces between the cylindrical surfaces.

4. A high-pressure apparatus as claimed in claim 1, comprising a pressure duct leading to each hollow body for locating pressurised liquid to the interior of the hollow body.

5. A high-pressure apparatus as claimed in claim 4, comprising regulating means for varying the pressure in the interior of each hollow body.

References Cited
UNITED STATES PATENTS

| 3,091,804 | 6/1963 | Gerard et al. | 18—Dig. 26 |
|---|---|---|---|
| 3,103,699 | 9/1963 | Gerard et al. | 18—Dig. 26 |
| 3,118,177 | 1/1964 | Von Platen | 18—Dig. 26 |
| 3,179,979 | 4/1965 | Bundy et al. | 18—Dig. 26 |
| 3,241,188 | 3/1966 | Tebbo et al. | 18—Dig. 26 |
| 3,584,336 | 6/1971 | Von Platen | 18—5 H |

J. HOWARD FLINT, JR., Primary Examiner

U.S. Cl. X.R.

425—77